United States Patent [19]

Ragland

[11] 4,307,893
[45] Dec. 29, 1981

[54] TRAILER HITCH
[75] Inventor: James H. Ragland, Sandpoint, Id.
[73] Assignee: Bike-A-Boose Mfg. Company, Sandpoint, Id.
[21] Appl. No.: 112,044
[22] Filed: Jan. 14, 1980
[51] Int. Cl.³ .......................... B60D 1/00; B62K 27/12
[52] U.S. Cl. .................................... 280/204; 280/485; 280/492; 280/495
[58] Field of Search ............... 280/204, 292, 483, 485, 280/486, 489, 492, 493, 495, 498, 1.5; 267/138
[56] References Cited
U.S. PATENT DOCUMENTS
624,678 5/1899 Planes .................................. 280/204
3,993,320 11/1976 Robinson ............................ 280/204

FOREIGN PATENT DOCUMENTS
615789 1/1927 France .................................. 280/204
888266 12/1943 France .................................. 280/204
898515 4/1945 France .................................. 280/292

Primary Examiner—Joseph F. Peters, Jr.
Assistant Examiner—Donn McGiehan
Attorney, Agent, or Firm—Edward D. O'Brian

[57] ABSTRACT

A hitch for use in towing a trailer behind a bicycle can be constructed using two elongated elastomeric straps, one end of each of the straps being connected to the bicycle and one end of each of the straps being connected to the trailer.

9 Claims, 1 Drawing Figure

U.S. Patent
Dec. 29, 1981
4,307,893
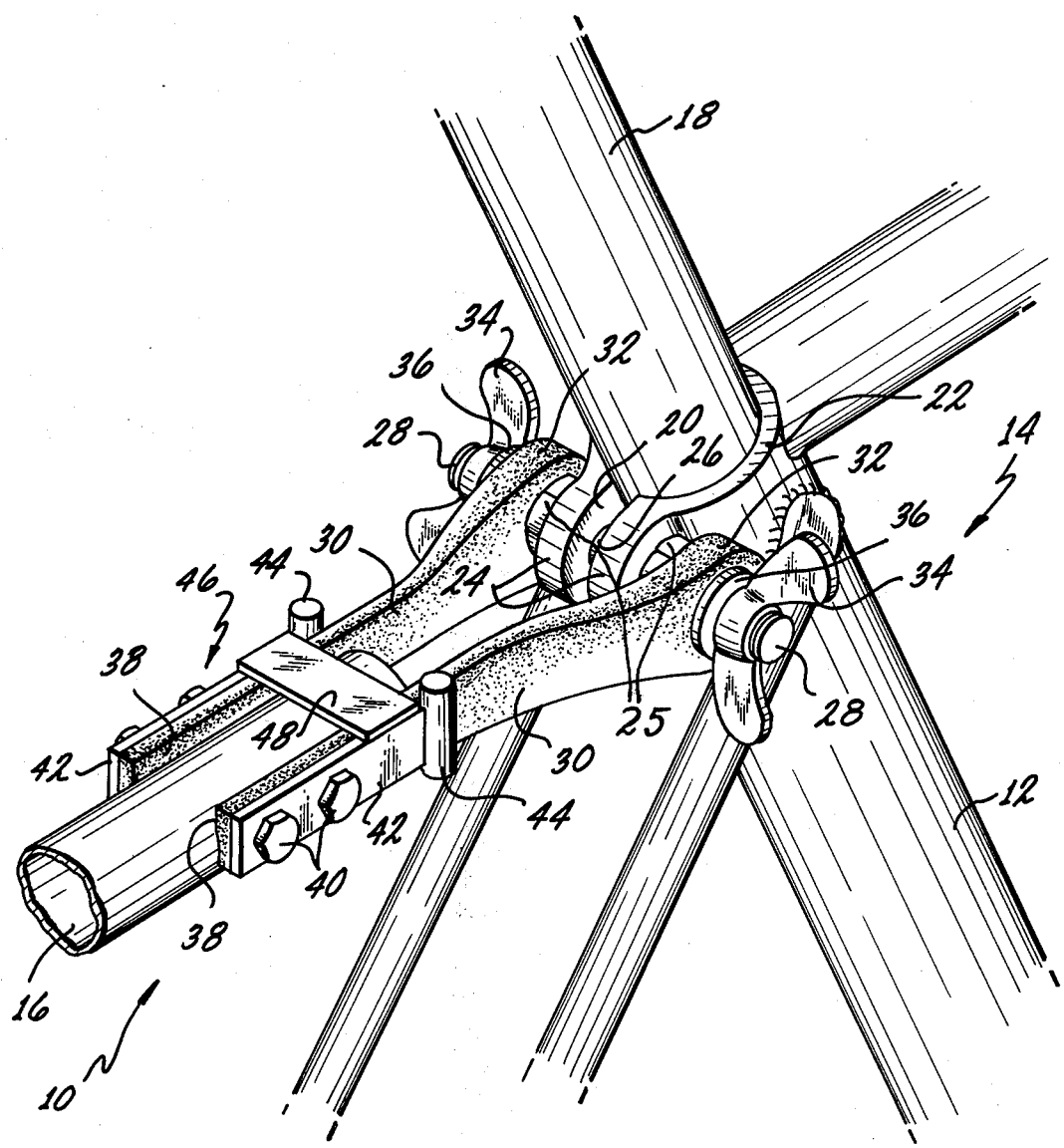

TRAILER HITCH

BACKGROUND OF THE INVENTION

The invention set forth in this specification pertains to new and improved trailer hitches which are considered to be of primary utility in connecting a bicycle to a trailer towed by such a bicycle but which are also considered capable of being utilized in towing trailers behind other types of vehicles.

In the past many different types of trailer hitches have been used in coupling a trailer to a towing vehicle. Virtually everyone is familiar with common ball and socket type joints which are commonly utilized for this purpose in connection with automotive type vehicles. Many individuals are also familiar with the use of interconnecting bolts, hooks or the like for use in connecting trailers to vehicles. Frequently specialized constructions involving an enlarged pin and a movably mounted bearing structure are utilized in connecting a trailer to a vehicle.

Although all of such constructions are unquestionably utilitarian it is considered that they are relatively unsuitable for use in connecting a trailer to a bicycle for any one of a variety of reasons. In general such prior structures are undesirably expensive for use in connection with bicycles. Frequently such prior structures are relatively heavy. This, of course, is disadvantageous in connection with a bicycle because in general the less the weight of the bicycle and the load moved using the bicycle, the easier it is to pedal the bicycle.

Normally such prior hitches are not constructed in such a manner as to accommodate relative movement between a bicycle and a trailer such as may be involved in laying the bicycle upon its side when it is not used. Further, such prior hitches normally are not constructed so as to minimize what may be loosely referred to as the "shock" transmitted to the towing vehicle as the towing vehicle is initially moved. This can be quite important in connection with a bicycle in avoiding problems in starting up the bicycle.

SUMMARY OF THE INVENTION

As a result of a consideration of the preceding it is believed that it will be apparent that there is a need for new and improved trailer hitches for use in coupling a trailer to a bicycle. Broadly the present invention is intended to fulfill or satisfy this need. The present invention is intended to provide trailer hitches which are relatively inexpensive; which may be easily and conveniently installed in coupling a trailer to a bicycle; which are capable of prolonged satisfactory performance or use with no maintenance; which are of such a character as to accommodate reasonably anticipated normal movements between a bicycle and a trailer tongue; and which are capable of absorbing sudden loads or shocks as a bicycle pulling a trailer is initially operated so as to minimize interference with the operation of the bicycle.

In accordance with this invention these various objectives are achieved by providing in the combination of a towing vehicle, a trailer adapted to be towed behind said vehicle and hitch means connecting said trailer to said vehicle the improvement which comprises:

said hitch means comprising two separate elongated straps, one end of each of said straps being connected to said trailer, one end of each of said straps being connected to said vehicle, said straps extending generally between said vehicle and said trailer and being capable of independent flexure intermediate their ends.

BRIEF DESCRIPTION OF THE DRAWING

The invention is best more fully explained with reference to the accompanying drawing in which:

The FIGURE is an isometric view showing a part of a frame of a bicycle connected to a part of the tongue of a trailer through the use of a presently preferred embodiment or form of a trailer hitch in accordance with this invention.

It is to be understood that the present invention employs certain intangible concepts or principles as are verbally defined in the appended claims. These concepts or principles can be utilized in a number of differently appearing and somewhat differently constructed hitches through the use of routine engineering skill.

DETAILED DESCRIPTION

In the drawing there is shown a hitch structure 10 of the present invention which extends generally between a vertically extending seat post holder 12 of a bicycle frame indicated generally at 14 and a tubular tongue 16 forming a part of a trailer (not shown) adapted to be towed behind a bicycle (not shown). This holder 12 is adapted to support a conventional bicycle seat post 18 and is provided with a split 20 adjacent to its upper end 22. Ears 24 are provided on the upper end 22 so that this upper end 22 may be used to clamp the seat post 18 in position. With the present invention a conventional fastener (not shown) as is normally utilized with such ears 24 is replaced by a threaded rod 26 which extends through the ears 24 and generally outwardly so that its ends 28 are exposed.

The hitch 10 includes two elongated, flexible, elastomeric straps 30 formed of natural or synthetic rubber. Each of these straps 30 has an enlarged end 32 shaped generally as an eyelet. These ends 32 are located over the ends 28 of the rod 26 and are adapted to be secured in place on the ends 28 through the use of the wing nuts 34 and washers 36. These wing nuts 34 may be utilized to clamp the ears 24 so as to hold the seat post 18 against movement as well as for the purpose of securing the straps 30 in place. If desired, however, conventional nuts 25 may be utilized between the ends 32 and the ears 24 on the rod 26 for the purpose of independently securing the seat post 18 in place.

The straps 30 also have other ends 38 which lie generally alongside the exterior of the tongue 16. These ends 38 may, if desired, be shaped so as to fit closely against the tongue 16. Several conventional fasteners 40 preferably extend through these ends 38 and the tongue 16 for the purpose of securing the ends 38 against movement relative to the tongue 16. If desired rigid retainers 42 may be located on the surfaces (not numbered) of the end 38 remote from the tongue 16 so as to be engaged by the fasteners 40 so as to minimize the chances of these fasteners 40 being inoperative for their intended purpose of securing the ends 38 to the tongue 16. Preferably these retainers 42 have rounded ends 44 so as to prevent abrasion of the straps 30 during the use of the hitch 10. If desired, the retainers 42 can be formed into a bracket 46 in which the retainers 42 serve as sides and are connected by a top 48 which to a degree facilitates the assembly of the hitch 10 upon the tongue 16. If desired a safety cable (not shown) may be secured to the bracket 46 so as to extend the post 18.

It is believed that it will be apparent from the preceding that the hitch structure 10 is a simple effective structure for its intended purpose. Because of the use of the two straps 30 so that they are horizontally displaced from one another and yet generally parallel to one another the hitch structure 10 is capable of accommodating any normally encountered relative movement between a bicycle and a trailer. The elastomeric character of the straps 30 used is considered desirable as facilitating the "smoothness" of using a bicycle as the trailer is towed behind such a bicycle. It is considered obvious that the hitch structure 10 is comparatively simple and easy to install.

I claim:

1. In the combination of a towing vehicle, a trailer adapted to be towed behind said vehicle said trailer having a tongue and hitch means connecting said tongue to said vehicle the improvement which comprises:

said hitch means comprising two separate elongated flexible, elastomeric straps, one end of each of said straps being connected to said tongue, one end of each of said straps being connected to said vehicle, said straps extending generally between said vehicle and said tongue and being capable of independent flexure intermediate their ends, said straps being horizontally displaced from one another and being generally parallel to one another.

2. The combination claimed in claim 1 wherein:

said ends of said straps secured to said tongue are secured to said tongue by fasteners extending through said straps and said tongue.

3. The combination claimed in claim 1 wherein:

said ends of said straps secured to said tongue are positioned on opposite sides of said tongue and extend along said tongue, and including retainer means engaging the portions of said straps extending along said tongue which are remote from said tongue.

4. In the combination of a towing vehicle, a trailer adapted to be towed behind said vehicle, said trailer having a tongue and hitch means connecting said tongue to said vehicle the improvement which comprises:

said hitch means comprising two separate elongated straps, one end of each of said straps being connected to said tongue, one end of each of said straps being connected to said vehicle, said straps extending generally between said vehicle and said tongue and being capable of independent flexure intermediate their ends, said straps are located so as to be spaced from one another horizontally, said ends of said straps secured to said tongue being positioned on opposite sides of said tongue and extend along said tongue, and retainer means engaging the portions of said straps extending along said tongue which are remote from said tongue.

5. The combination claimed in claim 4 wherein:

said towing vehicle includes a threaded rod having exposed ends, said ends of said straps secured to said vehicle are of an enlarged eyelet shape and fit over said ends of said threaded rod, said towing vehicle includes threaded nut means engaged on said ends of said threaded rod for securing said ends of an enlarged eyelet shape in place on said threaded rod.

6. The combination claimed in claim 4 wherein:

said vehicle is a bicycle, said ends of said straps secured to said tongue are secured to said tongue by fasteners extending through said straps, said tongue and each of said retainer means, said bicycle has a frame member for holding a seat post including a split upper end and ears extending from said upper end adjacent to the split therein, said bicycle includes a threaded rod extending through said ears, said threaded rod having exposed ends remote from one another, said bicycle includes threaded nut means located on both of said ends of said threaded rod, said ends of said straps secured to said bicycle are of an enlarged eyelet shape and fit over said ends of said rod between said nut means and said ears.

7. The combination claimed in claim 6 wherein:

said retainer means comprises a bracket having a top and two sides, said top fitting generally across and over said tongue and said ends of said straps secured to said tongue, said sides fitting along the exteriors of said straps remote from said tongue.

8. The combination claimed in claims 6 or 7 wherein:

said retainer means have rounded ends on the extremities of said retainer means closest adjacent to said bicycle.

9. The combination in claim 4 wherein: said straps are flexible, elastomeric straps.

* * * * *